United States Patent [19]

Rosier et al.

[11] 4,367,105

[45] Jan. 4, 1983

[54] METHOD AND APPARATUS FOR MAKING ELONGATED ARTICLES HAVING SHEATHED FOAM INSULATION

[76] Inventors: Lawrence L. Rosier, 812 Lindell Dr., Ballwin, Mo. 63011; William C. Mulder, 1891 Catlin, Barnhart, Mo. 63012

[21] Appl. No.: 264,149

[22] Filed: May 15, 1981

[51] Int. Cl.³ .................... B32B 31/06; B32B 5/20
[52] U.S. Cl. .................... 156/79; 138/119; 138/137; 138/149; 138/DIG. 9; 156/294; 156/392; 156/423; 156/494; 156/500; 264/46.5; 425/817 C; 428/36; 428/318.4; 428/319.3
[58] Field of Search ......... 138/119, 137, 149, DIG. 9; 156/78, 79, 294, 392, 423, 494, 500; 264/46.5; 425/817 C; 428/36, 318.4, 319.3

[56] References Cited

U.S. PATENT DOCUMENTS

| | | | |
|---|---|---|---|
| 3,443,984 | 5/1969 | Stewart | 117/94 |
| 3,709,751 | 1/1973 | Carlson et al. | 156/78 |
| 3,754,064 | 8/1973 | Snelling et al. | 264/40 |
| 3,797,981 | 3/1974 | Van Dijk | 425/110 |
| 3,927,164 | 12/1975 | Shimabukuro | 156/294 X |
| 3,941,531 | 3/1976 | Parker | 425/96 |
| 4,094,715 | 6/1978 | Henderson et al. | 156/78 |
| 4,134,782 | 1/1979 | Straughan | 156/79 |
| 4,270,961 | 6/1981 | Faranetta et al. | 156/79 X |
| 4,325,772 | 4/1982 | Suetoshi et al. | 156/294 |

Primary Examiner—Robert A. Dawson

Attorney, Agent, or Firm—Jerome A. Gross

[57] ABSTRACT

Insulated sheathing, such as a covering for a bundle of flexible tubes which deliver chilled beverages to a dispensing head, may be covered on their outer side by a seamless flexible sheath and similarly on the inner side of the insulation which surrounds the bundle of tubes. Flexible sheathing for the inner sheath is loaded bunched together on the outer surface of a hollow core near its downstream end. Similar larger diameter sheathing is bunched together on the upstream end of an outer concentric sleeve, whose downstream end is mounted on a slide. The downstream end of a bundle of tubes is inserted through the core, and connected to the downstream end of the inner sheathing and to the upstream end of the outer sheathing. The outer sheathing is then inverted by moving the sleeve upstream over the connected ends which are then drawn downstream together. Foam is then inserted between the two sheathings, to expand and press the outer sheathing outward, sliding against the inner surface of the sleeve as the inner sheathing presses inward and slides against the outer surface of the core. On emerging from the downstream ends of the core and sleeve, the inner sheathing is pressed against the bundle of tubes being fed through the core and the outer sheathing expands to its full diameter. The tooling and process has simpler applications, such as forming sheathed foamed coatings on pipes and forming hollow foam articles sheathed inside and out.

19 Claims, 9 Drawing Figures

METHOD AND APPARATUS FOR MAKING ELONGATED ARTICLES HAVING SHEATHED FOAM INSULATION

TECHNICAL FIELD

This invention relates to elongated foam insulation and foam insulated articles, the insulation being seamlessly sheathed. The invention has application in various fields, one being providing insulated bundles of flexible tubes which conduct refrigerated liquids used for mixing drinks (for example, soda and water) from storage sources to bars at which they are disposed.

BACKGROUND ART

Elongated articles of various types are commonly covered with foam insulation, which may be pre-foamed or foamed-in-place. For some uses, it is important to sheath the foam from external effects, for example, to prevent absorption of water, deterioration or abrasion. One example is in the insulation of bundles of flexible tubes utilized to conduct liquids such as soda and water from remote refrigerated storage sources to be dispensed at bars. Such bundles of tubing, which must be flexible, sometimes have been bound by spiral wrappings, then insulated with preformed foam insulation, and then covered with an outer spiral wrap. However, such spiral wrapping may not protect reliably, especially because of flexing of the bundle.

Rigid pipes have also been covered with foam sealed by an outer sheathing of plastic film. For example, in U.S. Pat. No. 4,134,782 to Straughan, a foam generator supplies foaming plastic material to the exterior of a pipe which is then covered by a wrapping of plastic film applied in a longitudinal ribbon with an overlapped longitudinal seam. A somewhat similar process is shown in U.S. Pat. No. 3,754,064 to Snelling, in which both the interior and exterior longitudinal sheathing is applied, each with an overlapped longitudinal seam. Likewise, for insulating pipe, spiral wraps of sheathing have been applied, as in U.S. Pat. No. 4,094,715 to Henderson and U.S. Pat. No. 3,941,531 to While each of these utilizations involves covering an elongated article, a need exists also for providing elongated hollow foam sections, as for ducts to conserve heat energy; and in this instance, both the inner and outer surfaces of such ducts may require sheathings.

DISCLOSURE OF THE INVENTION

In the method of the present invention, at least an outer seamless tubular flexible sheathing is stored on the upstream or loading portion of the outer surface of a tubular sleeve, supported at its downstream end on a longitudinal axis along which the sleeve is positionable relative to a work support guide or core. The upstream end of the sheathing is attached to a slide member, mounted concentric with the guide or core, when the sleeve is positioned downstream relative to it. Drawing the slide downstream relative to the mouth of the sleeve (or in most applications, initially moving the sleeve upstream relative to the core) reverses the upstream end of the sheathing and draws it downstream into the mouth of the sleeve. Thereafter as foam is introduced into the mouth of the sleeve, the foam presses against the sleeve inner surface now covered by the reversed sheathing, which slides readily against the inner surface of the sleeve. When the article so formed with foam and exterior sheathing leaves the downstream end of the sleeve, the pressure within the foam extends the seamless sheathing to its full extent, providing a smooth covering for the foam. The operation continues until a desired length of material has been formed.

In those preferred applications of the present invention where a seamless inner sheathing is also used, this is likewise stored bunched, in this instance on the portion of the outer surface of the guiding core which extends cantilever downstream from its upstream end. The slide member, which slides along the core, in this instance slides atop the inner sheathing, which is reversed and brought back over the forward end of the slide and there clamped to the upstream end of the outer sheathing. In the typical case where the sheathed insulation is to be provided about a pre-formed article, such as a bundle of tubing, this tubing is inserted into the upstream end of the hollow core, to be drawn through its interior as the inner sheathing is drawn along the exterior surface of the core; an inner-connected cable harness arrangement may be used to do this. The plastic foam material, expanding as it emerges from the downstream end of the tubular core, then presses the inner sheathing inward against the tubing bundle, filling the spaces between the tubes along the outer side of the bundle.

In the preferred embodiment, the foam is provided between the core and the sleeve by a conventional generator of foaming plastic material. However, a pre-foamed insulating ribbon, of sufficient width to wrap around the core, may instead be applied, clamped at its downstream end between such inner and outer sheathings and drawn into the mouth or upstream end of the sleeve simultaneously withdrawing a bundle of tubes through the core.

If a hollow section of insulation material is to be formed, the foam (in this case preferably generated at the site and applied as a liquid in the annular space between the sleeve and the core) is so supplied between the inner and outer sheathings without any pre-formed elongated article being utilized; the foam will then emerge solidified in a seamlessly sheathed duct-like section. For this use the interior sheathing may be of great importance. At the opposite end of the scale of uses, the inner sheathing is not used if a rigid pipe is to be coated. Such a pipe may be inserted through a mere guide, without any inner sheathing and its downstream end connected directly to the outer sheathing and drawn downstream with it as foam is generated around it. Together they emerge from the downstream end of the sleeve as an insulated seamlessly sheathed rigid article.

BEST MODES FOR CARRYING OUT THE INVENTION

Prior to describing the preferred process of the present invention the preferred apparatus, shown in the drawings, will be described.

Figure 8:
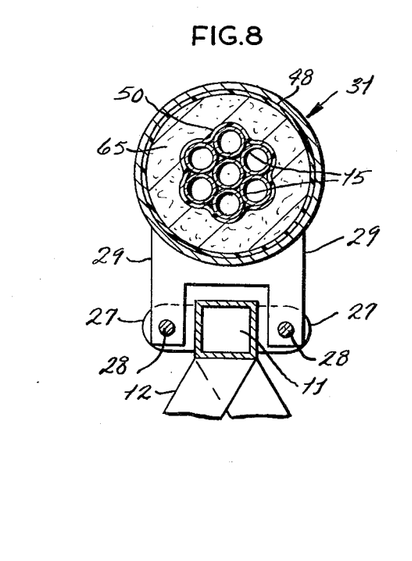
FIG. 8 is a cross-sectional view taken along line 8—8 of FIG. 7, also showing a structural support for sliding the mold sleeve axially.

Elongated base means generally designated 10 may be of any familiar simple construction such as a simple rigid square frame tube 11, shown in FIG. 8, and cross-braced legs 12. The base means so provided may be any convenient length, say 20 feet. Close to its upstream end is positioned a reel rack 13 illustrated schematically, bearing a plurality of reels 14 carrying the flexible tubing to be insulated; in the embodiment shown seven such reels are to be provided. The tubing 15 drawn from the reels 14 passes through a gathering eye 16 which may be carried by and project upward from the frame tube 11, gathering the tubes 15 together on the longitudinal axis 20 along which the process of the invention is performed.

Adjacent to the eye 16, welded on to the frame tube 11, is the support 21 for an elongated tubular mandrel or core 22. The core 22 is of heavy rigid steel tubing, cantilever-supported by the support 21 and projecting downstream concentric with the axis 20 a useful distance, say 15 feet, to its downstream end 23. On an intermediate portion, starting from the support 21 and extending downstream, the outer surface 24 of the core 22 has an uninterrupted cylindrical surface, the portion adjacent to the support 21 being referred to as the core outer loading surface 25. This is used for loading a length of inner flexible seamless sheathing, hereinafter referred to.

Extending along the sides of the frame tube 11 upstream from near its downstream end at least to a point near the core outer loading surface 25, and supported by sideward-extending lugs 27, are guide rods or ways 28. On these ways are mounted the longitudinally-bored mold sleeve slide mount blocks 29, which are welded to and support the downstream end 30 of an elongated mold sleeve generally designated 31. From the sleeve downstream end 30, so supported, the mold sleeve 31 extends upstream concentric with the axis 20 and spaced outward of the elongated core 22. This upstream portion of the mold sleeve 31 has a smooth uninterrupted outer cylindrical surface which is referred to as the outer loading surface 32; this terminates in a smoothly rounded edge at the inlet end 33.

Positioned a substantial distance, say 40 feet or more, from the downstream end of the frame tube 11 is a support 34 for controlled tension-exerting means, such as an electric winch designated 35 having a cable-like connector 36 which it draws downstream along the machine axis 20.

Figure 5:
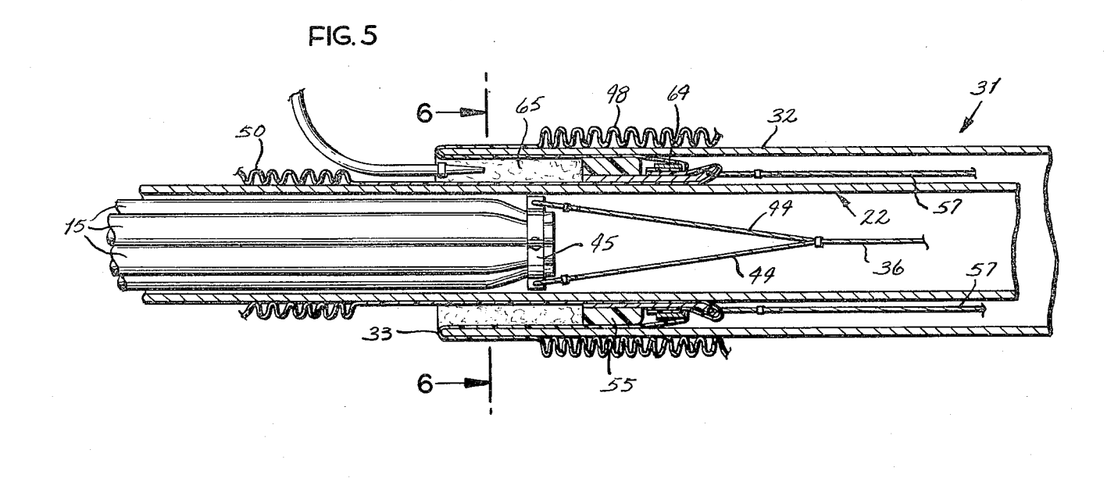
FIG. 5 is a view similar to FIG. 3 showing the mold sleeve moved to the farthest upstream position for foaming, with a foam nozzle inserted into its upstream end.

Conventional apparatus for generating an insulating foam is shown in the block marked foam generator 40. When operated in the conventional manner, a foamable plastic such as polyurethane will be generated and distributed through the flexible hose 41 to a nozzle 42 which, for loading, is readily movable out of the way but in operation is inserted in the inlet end 33 of the mold sleeve as shown in FIG. 5.

Figure 1:
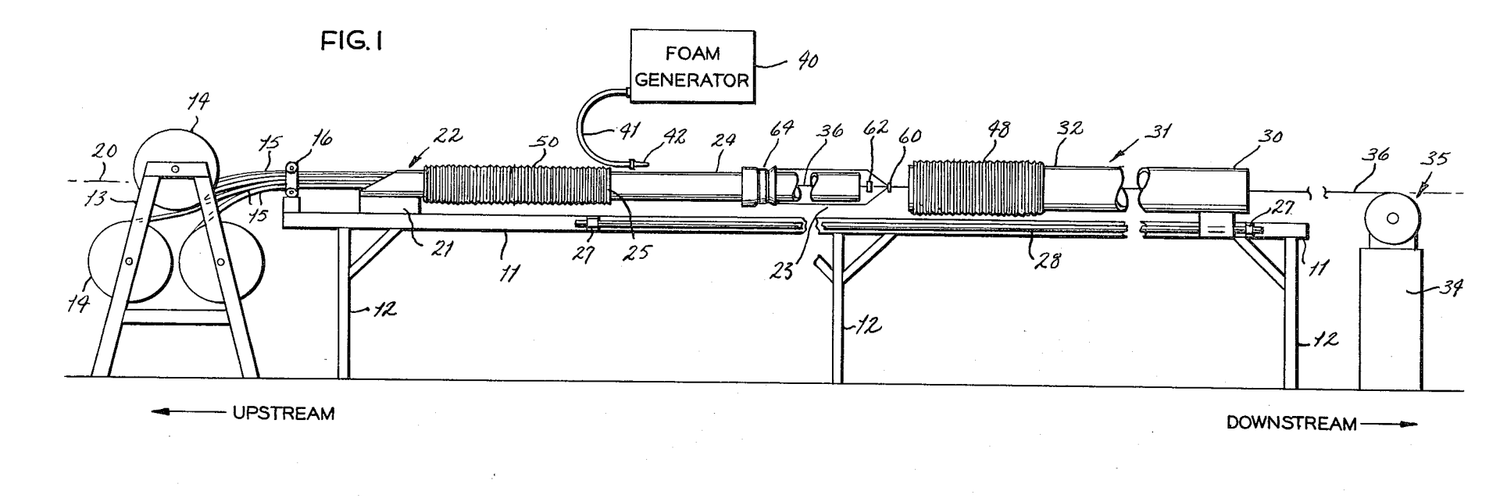
FIG. 1 is a side view, partially schematic, of apparatus embodying the present invention, with a mold sleeve shown in a downstream loading position.
Figure 2:
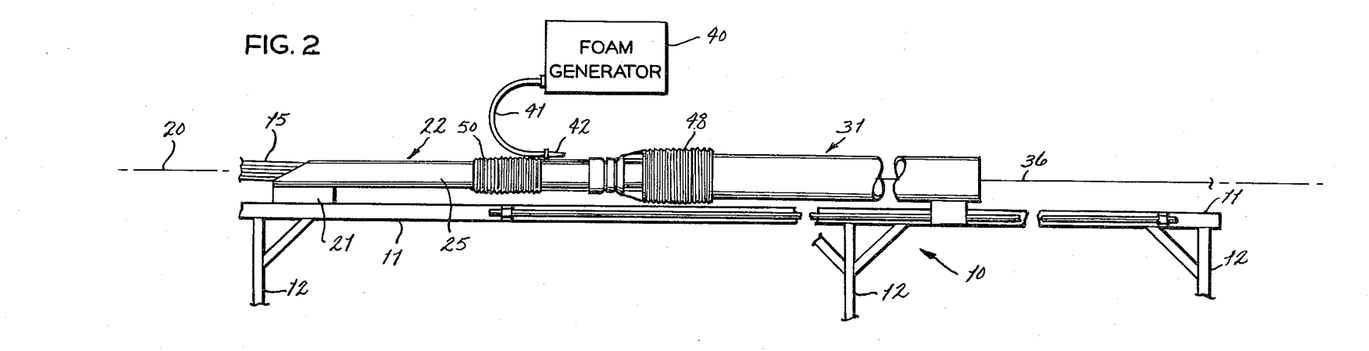
FIG. 2 is a fragmentary view similar to FIG. 1 showing the mold sleeve moved upstream to a sheath-joining position.
Figure 4:
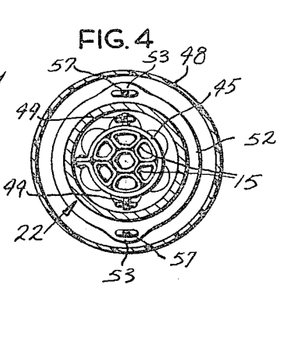
FIG. 4 is a cross-section taken along line 4—4 of FIG. 3.

For advancing the tubing 15 through the gathering eye 16 and the core 22, tension of the connector cable 36 is applied through a pair of diagonal connectors 44 to a tube clamp 45. As best seen in FIGS. 4 and 5, the tube clamp 45 is smaller than the inside diameter of the core 22. In order to apply it, the connector cable 36 may be passed through and out the upstream end of the core 22, just downstream of the gathering eye 16 shown in FIG. 1; the clamp 45 is then applied to the ends of the several pieces of tubing 15, drawing them together as shown in FIGS. 4 and 5; after which the winch 35 draws the cable 36 and its attached diagonal connectors 45 downstream to a point within the core 22 a convenient amount, preferably somewhat past the position of the foam nozzle 42 as seen in FIG. 1.

It is additionally necessary to load the machine with the material which will serve as inner and outer seamless sheathings for the insulations. With the mold sleeve 31 in its downstream or loading position, as shown in FIG. 1, a length of seamless tubular flexible plastic sheathing material, such as polyethylene, whose tubing diameter is slightly greater than the outer diameter of the sleeve 31, is applied on its upstream end 32. As may be seen, the entire surface of the sleeve 31 upstream of its cantilever support by the mount blocks 29 is available for loading this material; accordingly, 50 feet or so of the material 48, so bunched, may be loaded in place.

Likewise, a similar length of seamless tubular inner sheathing material 50 is loaded on the outer loading surface 25 of the core 22, starting at its downstream end for bunching the material upstream adjacent to the welded core support 21. The inner sheathing 50 is sufficiently great to permit it to be bunched on the outer surface of the core 21.

Figure 3:
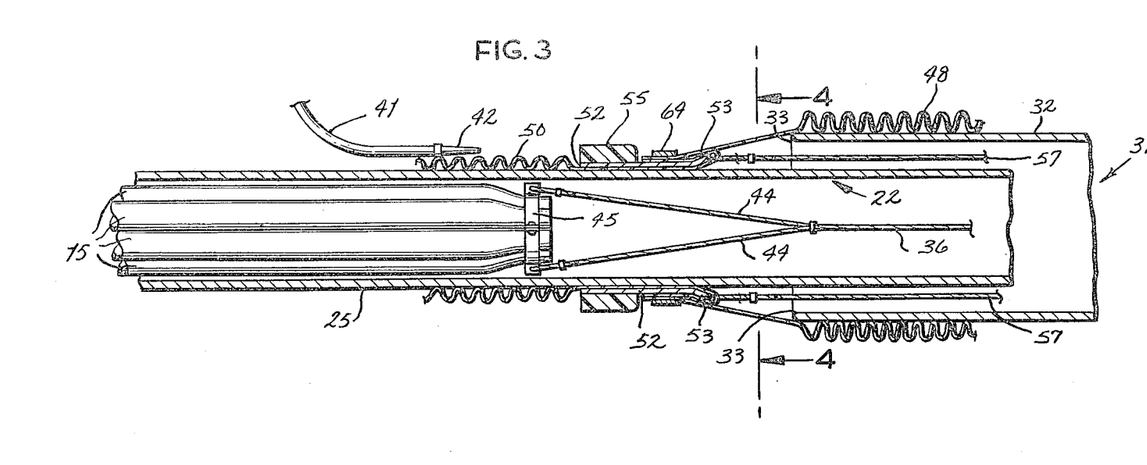
FIG. 3 is an enlarged fragmentary view of the center portion of FIG. 2, showing a connection outward of a hollow mandrel or core for connecting the ends of an outer sheathing. Inside the mandrel is shown the connection which clamps the end of a tube to be covered with foam insulation.

The downstream end of the inner sheathing material 50 and the upstream end of the outer sheathing material 48 are then joined to each other in the following manner: the downstream end of the inner sheathing material 50 is drawn smoothly downstream along the outer surface of the core 22 as shown in FIG. 4, and a slide mount 52 is applied over the upper surface of the end portion so drawn, and is then drawn back aft over two forward end mount lugs 53 which penetrate it. The aft portion of the slide mount 52 mounts a foam stop ring 55, whose outer diameter is nearly as great as the inner diameter of the mold sleeve 31, leaving an annular space along the forward portion of the outer surface of the slide mount 52. A pair of slide mount cables 57 are connected to the mount lugs 53; these extend downstream as shown in FIG. 3 and are joined at their forward ends by small ring 60, as seen in FIG. 1, positioned slightly downstream from a stop 62 affixed to the cable connector 36 which passes along the longitudinal axis 20. As a result, drawing the cable connector 36 downstream will present the stop 62 against the ring 60, these portions then serving as means to innerconnect and coordinate downstream movement of the cable connector 36 with the slide mount cables 57.

After the slide mount cables 57 are so connected, the upstream end of the outer sheathing 48 is drawn upstream over the slide mount 52, and there clamped to the downstream end of the inner sheathing 50 by a clamp ring 64, having a conventional clamp tightening provision.

The mold sleeve 31 is then moved upstream to the foaming position shown in FIG. 5. The movement from the loading position, FIG. 3, to the foaming position, FIG. 5, has the following unusual consequence: the attendant axial change feeds the upstream end of the outer sheathing 48 reversibly around the inlet end surface 33 of the mold sleeve 31 and into its upstream end 32. Hence, as seen in FIG. 5, downstream movement of the cable 36, following contact of the stop 62 with the ring 60, will draw the bundles of tubing 15 downstream inside the core 22 while it draws the outer and inner sheathings 48, 50 simultaneously downstream in the annular space between the outer surface of the core 22 and the inner surface of the sleeve 31, the sheathings 48, 50 being maintained separate from each other by the foam stop ring 55.

Figure 6:
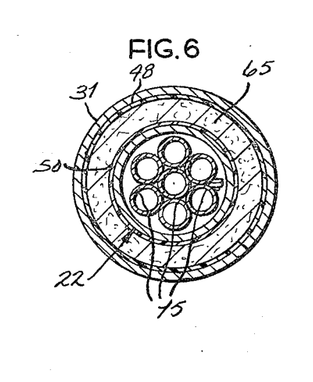
FIG. 6 is a cross-section taken along line 6—6 of FIG. 5.

After these preliminary steps of loading the outer and inner sheathings 48, 50, passing the leading ends of a bundle of tubes 15 into the tubular core, joining the downstream end of the inner sheathing 50 and the upstream end of the outer sheathing 48, and effecting an interconnection with the leading ends of the tubing 15, and then moving the mold sleeve 31 axially relative to the core 22 so that the core projects into the mold sleeve as shown in FIG. 5, the following operative steps are then performed:

With the foam nozzle 42 positioned to feed an expanding foaming plastic from the foam generator 40 into the annular space at the inlet end 33 of the mold sleeve 31, between the outer and inner sheathings 48, 50, the foam is generated and supplied as the winch 35 draws the connector cable 36 downstream at a controlled rate coordinated with the rate of foam supply. Foaming plastic material so fed expands behind the annular foam stop 55, which holds the sheathings separate from each other. As the foam expands, it presses the inner and outer sheathings 50, 48 respectively against the outer surface of the core 22 and the inner surface of the mold sleeve 31. The sheathing material slides smoothly against these surfaces, whereas in its absence the foam would adhere to them. The pressure generated in the foam causes it to distribute itself substantially evenly within the annular space between the core 22 and sleeve 31. As the assembly progresses toward the downstream end of the core 22, the arrangement of the tubing 15 within the core 22, the inner sheathing 50 against its outer surface, the outer sheathing 48 within the inner surface of the sleeve 31, and the foamed plastic layer 65 between the two sheathings, is as shown in FIG. 6.

Figure 7:
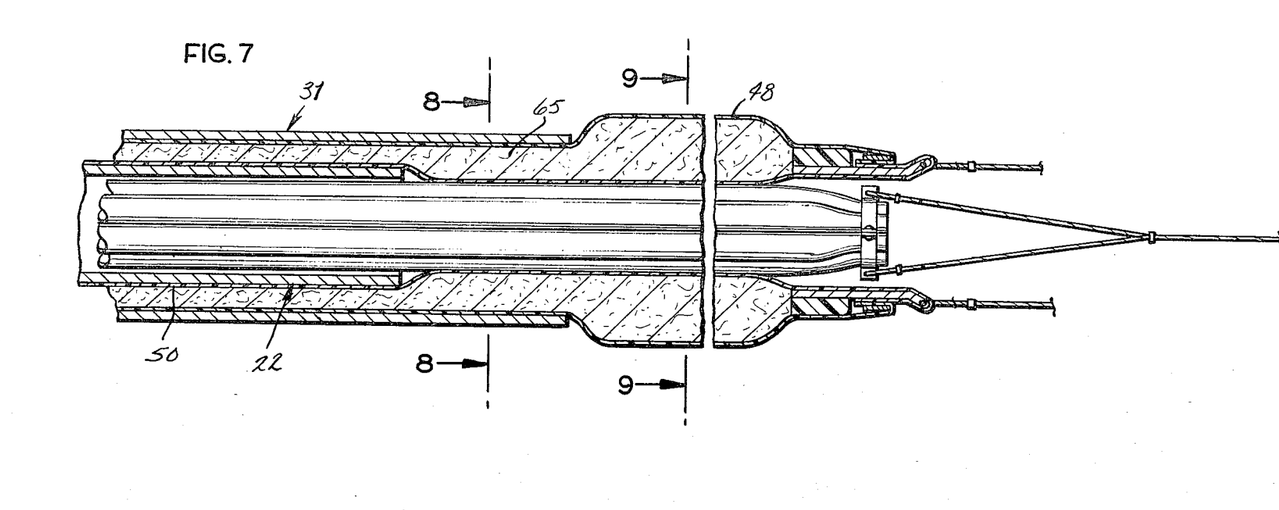
FIG. 7 is an enlarged view showing a sheathed foamed article emerging from the tubular core and from the downstream end of the mold sleeve.
Figure 9:
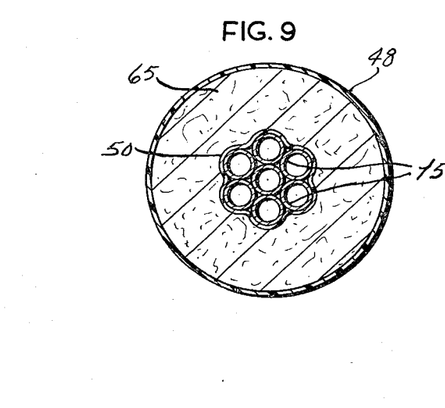
FIG. 9 is a cross-sectional view of the completed foam-insulated article as seen along line 9—9 of FIG. 7.

With the foam layer 65 still expanding, the article so being foamed is drawn outward from the downstream ends of the core 22 and sleeve 31, as shown in FIG. 7. Assuming the downstream end of the core 22 terminates prior to the termination of the sleeve 31 (which is a matter of designer's choice), the foaming plastic will then press inward, forcing the inner sheathing 50 into the spaces between the outer surface of the bundle of tubing 15 in the undulated manner shown in the cross-section FIG. 8. This inward expansion may proceed to take up all slack in the inner sheathing 50. As the foam covered article then exits from the downstream end of the sleeve 31, the residual pressure in the foam plastic layer 65 expands the foam to take up the slack in the outer sheathing 48, extending it to its full diameter as shown in FIG. 7 and in the cross-section FIG. 9.

If a hollow article such as a section of plastic duct is to be formed, with seamless sheathing on its inner and outer sides, the same apparatus may be utilized. For this purpose there is no need for the tube clamp 45 and cables 44; the core 22 could be solid rather than hollow.

Further, for covering a pre-formed pipe or rod with a foam plastic having an outer seamless sheath, the rigidity of the pipe or rod might permit the core 22 to be reduced greatly in length, so that where the article was of sufficient rigidity, a mere guide at the upstream or inlet end 33 of the sleeve 31 may suffice to hold it concentric along the axis 20. The outer sheathing upstream end may be attached directly to the end of the pipe to be so insulated.

Should an insulating ribbon of pre-formed elastic foam material be desired to be utilized, instead of the type of chemical plastic which foams in place, this may be done as follows: by wrapping the end of the foam ribbon about the downstream end of the inner sheathing 50 and clamping it, along with the outer sheathing 48, on to the slide mount 52. Then, drawing the clamped ends into the sleeve 31 will itself compress the preformed foam without provision of an annular space outwardly of a mandrel or core. For this application, the core itself need not extend into the mouth of the pre-formed foam against the bundle of tubing, and its elastic compression will itself assure substantial concentricity. Hence, for the use of a pre-formed foam ribbon, whose side edges are to be abutted longitudinally around the tubes through the bundle of tubing 15 drawn through the sleeve, it is preferred that the sleeve 31 be positioned axially slightly downstream from the downstream end of the core 22, to permit immediate abutting of the longitudinal edges of the preformed foam ribbon as it is drawn from its source into the upstream end 33 of the sleeve 31.

INDUSTRIAL APPLICABILITY

The principal uses of the present invention, as now contemplated, are:

For the specialized use in supplying inward and outward sheathed insulated bundles of tubing for conducting liquids, as well as other elongated articles having a seamless sheathing on the inner side of the insulated covering, as well as on its outer side, For insulating elongated rigid pipes with foam insulation, either rigid or elastic, the foam being seamlessly sheathed on its outer side; and For hollow articles, such as insulating duct sections, sheathed seamlessly on both inner and outer sides.

We claim:

1. The method of covering a previously formed elongated article with foam insulation sheathed seamlessly both against the said article and also on the outer side of such insulation, comprising the preparatory steps of loading a length of seamless tubular flexible outer sheathing bunched axially on the outer side of an elongated mold sleeve, loading a similar length of seamless flexible inner sheathing bunched axially on an intermediate portion of the outer side of an elongated tubular core supported by its upstream portion and positioned co-axially with and upstream of such mold sleeve, passing the leading end of the previously formed article through said tubular core, joining said leading end with the downsteam end of said inner sheathing and with the upstream end of said outer sheathing, moving said joined ends downstream inside said elongated mold sleeve whereby to reverse and invert the outer sheathing, and while continuing to move said ends downstream, introducing foam insulation material between said sheathings upstream of said joined ends.

2. The method as defined in claim 1 wherein the said foam insulation material is expanding foaming plastic introduced into the upstream end of said mold sleeve between said inverted outer sheathing and said inner sheathing as their said joined ends are progressively moved downstream.

3. The method as defined in claim 1, in which the said foam insulation is a compressible elastic ribbon whose width is sufficient to surround such previously foamed article, and in which the step of joining the said ends includes joining to them the leading end of such insulation ribbon, and the step of introducing same between the sheathings includes compressing said ribbon as it enters the said mold sleeve.

4. The method of covering a previously formed elongated flexible article with foam insulation sheathed both against the said article and also on the outer side of such insulation, comprising the preparatory steps of providing tubular flexible outer sheathing on the outer side of an elongated mold sleeve, providing tubular flexible inner sheathing on an intermediate portion of the outer side of an elongated tubular core supported by its upstream portion and positioned co-axially with and upstream of such mold sleeve, passing the leading end of the previously formed flexible article through said tubular core, joining said leading end with the downstream end of said inner sheathing and with the upstream end of said outer sheathing, and so moving the mold sleeve and core relative to each other along said axis that the core projects such a distance into the mold sleeve as will invert the upstream end of said outer sheathing and draw the joined ends of said sheathings into and downstream from the upstream end of said mold sleeve;

together with the operative steps of drawing the leading ends of said previously formed article and the said inner sheathing and outer sheathing together progressively downstream through said mold sleeve, and simultaneously introducing foam plastic material into the upstream end of said mold sleeve between said inner and outer sheathings, and permitting said foam plastic material to expand radially inward and outward as the said materials so assembled and drawn pass out of the downstream end of the mold sleeve.

5. The method of forming, on and about a rigid tube or like elongated article of constant external cross-section, foamed insulation having a seamless outer sheath, comprising the preliminary steps of loading a length of seamless tubular flexible outer sheathing bunched axially on the outer side of an elongated mold sleeve, passing the leading end of said elongated article downstream through supporting guide means positioned concentric with and adjacent to the upstream end of said mold sleeve, joining the leading end of said elongated article to the upstream end of said outer sheathing, and advancing the ends so joined into the upstream end of said mold sleeve, whereby to invert such sheathing stream end about the upstream end of said mold sleeve and cause such sheathing to be drawn reversibly downstream into said mold sleeve, together with the operative steps of further advancing the joined ends of said elongated article and said outer sheathing together progressively downstream from said mold sleeve, and simultaneously introducing an expanding foaming plastic into the upstream end of said mold sleeve between said elongated article and said outer sheathing, and permitting the plastic to expand and cure while so drawn downstream, whereby as the foaming plastic expands it presses the outer sheathing formingly against the inner surface of the mold sleeve, thereby to provide sheathed foam insulation evenly about the elongated article.

6. The method of making an elongated hollow article including foam insulation sheathed seamlessly along its inward hollow and its outward side, comprising the preliminary steps of loading a length of seamless tubular flexible outer sheathing bunched axially on the outer side of an elongated mold sleeve, loading a similar length of seamless flexible inner sheathing bunched axially on the outer side of an intermediate portion of an elongated core supported by its upper end portion and positioned coaxially with and upstream of said mold sleeve, joining the downstream end of said inner sheathing with the upstream end of said outer sheathing, and so moving the mold sleeve and core relative to each other along said axis that the core projects such a distance into the mold sleeve as will draw the joined ends of said sheathings into the upstream end of said mold sleeve, together with the operative steps of drawing the joined ends of said inner and outer sheathings together progressively downstream from said mold sleeve, and simultaneously introducing an expanding foam plastic into the upstream end of said sleeve mold between said inner and outer sheathings, and permitting the plastic to expand and cure while so drawn downstream, whereby as the foaming plastic expands it presses the outer sheathing formingly outwardly against the inner surface of the mold sleeve and presses the inner sheathing formingly inward against the outer surface of the core.

7. The method defined in claim 4, 5 or 6, together with the additional operative step of drawing the expanding article outward from the downstream end of said mold sleeve, whereby continuing outward expansion thereafter draws said outer sheathing to remove folds and wrinkles therein.

8. For use in foaming insulation within a seamless tubular outer sheathing, the method of preparing for foaming within a mold sleeve backing such outer sheathing, comprising the steps of positioning an elongated mold sleeve concentric with a core and downstream of at least the upstream portion of the core, loading a length of seamless tubular flexible outer sheathing bunched axially on the outer side of said mold sleeve, securing the upstream end of such sheathing in a position relative to said core, and then moving said mold sleeve upstream, whereby so moving the mold sleeve effects inversion of and draws the leading end of such outer sheathing reversibly into the upstream end of and within said mold sleeve outwardly of said core.

9. The method defined in claim 8, together with the further steps, prior to said step of moving said sleeve upstream, of loading a similar length of seamless flexible inner sheathing bunched axially on the outer side of said core, and securing the downstream end of said inner sheathing relative to the upstream end of said outer sheathing, whereby the moving of said sleeve upstream provides inner and outer seamless sheathings between the core and the upstream end of the mold sleeve for receiving foaming insulation.

10. The method as defined in claim 9, together with the further step, prior to said step of moving said mold sleeve upstream, of passing the leading end of a previously formed flexible article into and along the axis of said core and securing its said end relative to the said sheathing ends so secured relative to each other.

11. Apparatus for making elongated articles including foamed plastic insulation covered with a seamless flexible outer sheathing, comprising base means having an upstream end and a downstream end, means to advance work therealong in a downstream direction, an elongated mold sleeve having an axis defining a stream axis, and having, at its downstream end, support means supported by said base means, and having upstream of said support means an uninterrupted outer loading surface, work-supporting guide means having an axis coincident with said stream axis and supported adjacent to its upstream end by said base means, means to provide for axial change, along said base means, of the relative positions of said mold sleeve and said work-supporting guide means from a loading position in which the mold sleeve is spaced downstream from the supporting guide means, to an operating position in which the said guide means is adjacent to and concentrically inward of the upstream end of said mold sleeve, and means to supply foaming plastic material outward of said guide means into the upstream end of said mold sleeve when in said operating position, whereby when in loading position a length of seamless tubular flexible outer sheathing has been loaded bunched axially on said mold sleeve outer loading surface and the upstream end of said outer sheathing has been joined to the downstream end of work supported by the work-supporting guide, then after such axial change from loading position to operating position, downstream advance of the work will feed such outer sheathing reversibly into the upstream end of the mold sleeve, and expansion of foaming plastic material so supplied will press such outer sheathing slidingly along the inner surface of the mold sleeve.

12. Apparatus as defined in claim 11, wherein said means to advance work in a downstream direction includes tension-exerting means having a cable-like connector extensible through the downstream end of said mold sleeve and connectible to the ends so joined.

13. Apparatus as defined in claim 11, wherein said supporting guide means comprises an elongated core having a portion projecting downstream from its said support by said base means and having a downstream end portion presented, when in such operating position, concentrically with and spacedly inward of the mold sleeve, whereby after said ends have been so joined, such axial change from loading position to operating position will position such joined ends within the upstream end of the mold sleeve.

14. Apparatus as defined in claim 13, where said elongated core is tubular, whereby the work supported thereby may include a previously formed elongated article having an end inserted downstream through said tubular core.

15. Apparatus as defined in claim 11, wherein said supporting guide means comprises an elongated core having a portion projecting downstream from its said support by said base means and having a downstream end portion presented, when in such operating position, concentrically with and spacedly inward of the mold sleeve, and said elongated core has, between its upstream end support and its downstream end, an intermediate portion having an outer loading surface, whereby a length of seamless tubular flexible inner sheathing may, when the apparatus is in such loading position, be loaded bunched axially on the said outer loading surface for sliding against the outer surface of the downstream end portion of said core.

16. Apparatus as defined in claim 15, wherein said elongated core is tubular, whereby when such work so supported includes a previously formed elongated flexible article the foaming expansion will press such inner sheathing sealedly inward against the outer surface of such elongated article as it emerges from said tubular core.

17. Apparatus as defined in claim 15, wherein said means to advance the work in a downstream direction includes a tension-exerting means, a cable-like connector extensible therefrom through the downstream end of said mold sleeve, and clamp-like connector means to attach such sheathing ends so to be joined, said clamp-like connector means being mountable slidably along the elongated core.

18. Apparatus as defined in claim 15, wherein said elongated core is tubular, and said means to advance the work in a downstream direction includes a tension-exerting means, a cable-like connector extensible therefrom through the downstream end of said mold sleeve, and clamp-like connector means to attach such sheathing ends so to be joined, said clamp-like connector means being mountable slidably along the elongated core, together with means to interconnect said clamp-like connector means to the downstream end of such elongated article.

19. Apparatus as defined in claim 17 or claim 18, wherein said slidable clamp-like connector means has at its upstream side, foam stop means to establish separation of the inner and outer sheathings between the core and the inner wall of the mold sleeve.

* * * * *

UNITED STATES PATENT AND TRADEMARK OFFICE
CERTIFICATE OF CORRECTION

PATENT NO. : 4,367,105
DATED : January 4, 1983
INVENTOR(S) : Lawrence L. Rosier and William C. Mulder It is certified that error appears in the above–identified patent and that said Letters Patent are hereby corrected as shown below:

Column 1, line 14, delete "disposed" and insert ---dispensed---.
Column 1, line 42, after "to" insert ---Parker.---
Column 4, line 42, delete "21" and insert ---22---.
Column 4, line 48, delete "4" and insert ---3---.
Column 10, line 22, Claim 14, delete "where" and insert ---wherein---.

Signed and Sealed this

Twenty-second Day of March 1983

[SEAL]

Attest:

GERALD J. MOSSINGHOFF

Attesting Officer    Commissioner of Patents and Trademarks